United States Patent [19]

Hepp et al.

[11] Patent Number: 5,235,447
[45] Date of Patent: Aug. 10, 1993

[54] COLOR MATRIX SCREEN WITH COLORED FILTERS IN A TRIAD OR DELTA LAYOUT WITH TWO SUB-PIXELS PER COLOR

[75] Inventors: Bernard Hepp, Grenoble; Bruno Mourey; Pascal Royer, both of Voiron, all of France

[73] Assignee: Thomson LCD, Puteaux, France

[21] Appl. No.: 809,439

[22] Filed: Dec. 17, 1991

[30] Foreign Application Priority Data

Dec. 21, 1990 [FR] France ................... 90 16129

[51] Int. Cl.$^5$ .................. G02F 1/1343; G02F 1/1335
[52] U.S. Cl. .......................... 359/54; 359/68
[58] Field of Search ............... 340/784; 359/68, 59, 359/54, 61

[56] References Cited

U.S. PATENT DOCUMENTS

| | | | |
|---|---|---|---|
| 4,653,862 | 3/1987 | Morozumi | 359/67 |
| 4,834,505 | 5/1989 | Migliorato et al. | 359/67 |
| 4,950,058 | 8/1990 | Diem et al. | 359/68 |
| 5,144,288 | 9/1992 | Hamada et al. | 359/68 |
| 5,151,689 | 9/1992 | Kabuto et al. | 359/68 |
| 5,157,524 | 10/1992 | Dijon et al. | 359/54 |

FOREIGN PATENT DOCUMENTS 0158366 10/1985 European Pat. Off. .
0282718 11/1988 Japan ..................... 359/54
88/05170 7/1988 PCT Int'l Appl. .

*Primary Examiner*—William L. Sikes
*Assistant Examiner*—Anita Pellman Gross
*Attorney, Agent, or Firm*—Roland Plottel

[57] ABSTRACT

Disclosed is a color matrix screen with colored filters in a triad or delta layout. In this layout, the pixels are formed by two adjacent sub-pixels that are aligned along the lines and columns of the matrix, the colored filters of the lines n (n may be odd or even) being arranged according to the sequence A,A, B,B, C,C and the colored filters of the lines n+1 being arranged according to the sequence C,C, A,A, B,B where A,B,C is any combination of red, green, blue with the offset of a sub-pixel at each end of the line, and wherein each column is constituted by two parallel column elements connected to each other at each end, two adjacent sub-pixels of a line with colored filters of a same color being each connected to a different column element Application to liquid crystal screens.

5 Claims, 2 Drawing Sheets

COLOR MATRIX SCREEN WITH COLORED FILTERS IN A TRIAD OR DELTA LAYOUT WITH TWO SUB-PIXELS PER COLOR

BACKGROUND OF THE INVENTION

1. Field of the Invention

The present invention relates to color matrix screens with colored filters in a triad or delta layout, more particularly large-sized matrix screens, notably matrix screens that are compatible with a television type display.

2. Description of the Prior Art

In a known way, a matrix screen is constituted by two conductive arrays called lines and columns, each intersection of a line and a column forming an image dot or a pixel. To obtain a color display, a mosaic of filters colored red, green and blue is superimposed on these pixels, each filter being before a pixel.

Different layouts may be used to arrange the colored filters so as to obtain the desired color at output. These layouts include notably the triad or delta layout in which the color is obtained by the use of solely red, blue and green pixels arranged in a triangle.

As is shown in FIG. 1, the color matrix screens with colored filters in a triad or delta layout, as manufactured at present, are constituted essentially by a number of parallel lines L1, L2, . . . and by a number of columns C1, C2, C3, C4, C5 . . . , and by pixels P formed at the intersection between the columns C1, C2, . . . and the lines L1, L2, . . . To obtain a color screen, colored filters are associated with each pixel P. Because of their triad or delta layout, the colored filters of the odd lines, namely L1 and L3, are arranged in the sequence blue, red, green, while the colored filters of the even lines L2, . . . are arranged in the sequence green, blue, red. To obtain a triad or delta layout, the even lines have to be offset, in the embodiment shown, by a half pixel, in such a way that the centers of the associated pixels red, green and blue are at the vertices of an isosceles triangle, as represented by the triangle D in FIG. 1. Furthermore, in the context of FIG. 1, an active matrix screen is shown. In this case, the pixels are constituted by electrooptical elements such as a liquid crystal, and they are connected to the corresponding line and column by means of a transistor which is conventionally symbolized by a simple line placed near the intersection of the line conductor and the column conductor considered. These transistors are advantageously thin film transistors (TFTs) and are manufactured in the usual way. As shown in FIG. 1, owing to the offset of the pixels from one line to the next enabling the triad or delta layout to be obtained, the columns are no longer parallel to one another but have to be offset by half a pixel every two lines, as shown in FIG. 1. Consequently, the path of the columns is very important. This raises a number of problems for the addressing, the manufacturing technology and the design. However, a triad or delta arrangement of colored filters provides for an improved reconstruction of the color in the display as compared with other arrangements of colored filters that allow the parallel columns to be kept.

The present invention is therefore aimed at proposing a new structure of colored filters that can be used to have a triad or delta layout while at the same time overcoming the problems encountered in prior art color matrix screens with colored filters in triad or delta layout.

SUMMARY OF THE INVENTION

An object of the present invention, therefore, is a color matrix screen with colored filters in a triad or delta layout, wherein the pixels are formed by two adjacent sub-pixels that are aligned along the lines and columns of the matrix, the colored filters of the lines n (n may be odd or even) being arranged according to the sequence A,A, B,B, C,C and the colored filters of the lines n+1 being arranged in the sequence C,C, A,A, B,B where A,B,C is any combination of red, green, blue with the offset of a sub-pixel at each end of the line, and wherein each column is constituted by two parallel column elements connected to each other at each end, two adjacent sub-pixels of a line with colored filters of a same color being each connected to a different column element.

According to another characteristic of the invention, which is useful chiefly for the color matrix screens used in a television type system, each sub-pixel has a ratio $x/y = 1/3$, x being the linewise dimension of the sub-pixel and y being its columnwise dimension.

BRIEF DESCRIPTION OF THE DRAWINGS

Other features and advantages of the present invention shall appear from the following description of a preferred embodiment of the present invention, said description being made with reference to the appended drawings, of which.

DETAILED DESCRIPTION OF THE INVENTION

The present invention shall be described with reference to an active matrix type screen in which the electrooptical element is constituted by a liquid crystal and the switching element by a transistor. However, it will be clear to those skilled in the art that the present invention can be implemented with matrix screens in which the electrooptical element makes use of technologies other than that of liquid crystals, and in which the switching element may be formed by a diode or similar device. The present invention can also be applied to other types of matrix screens.

Figure 2:
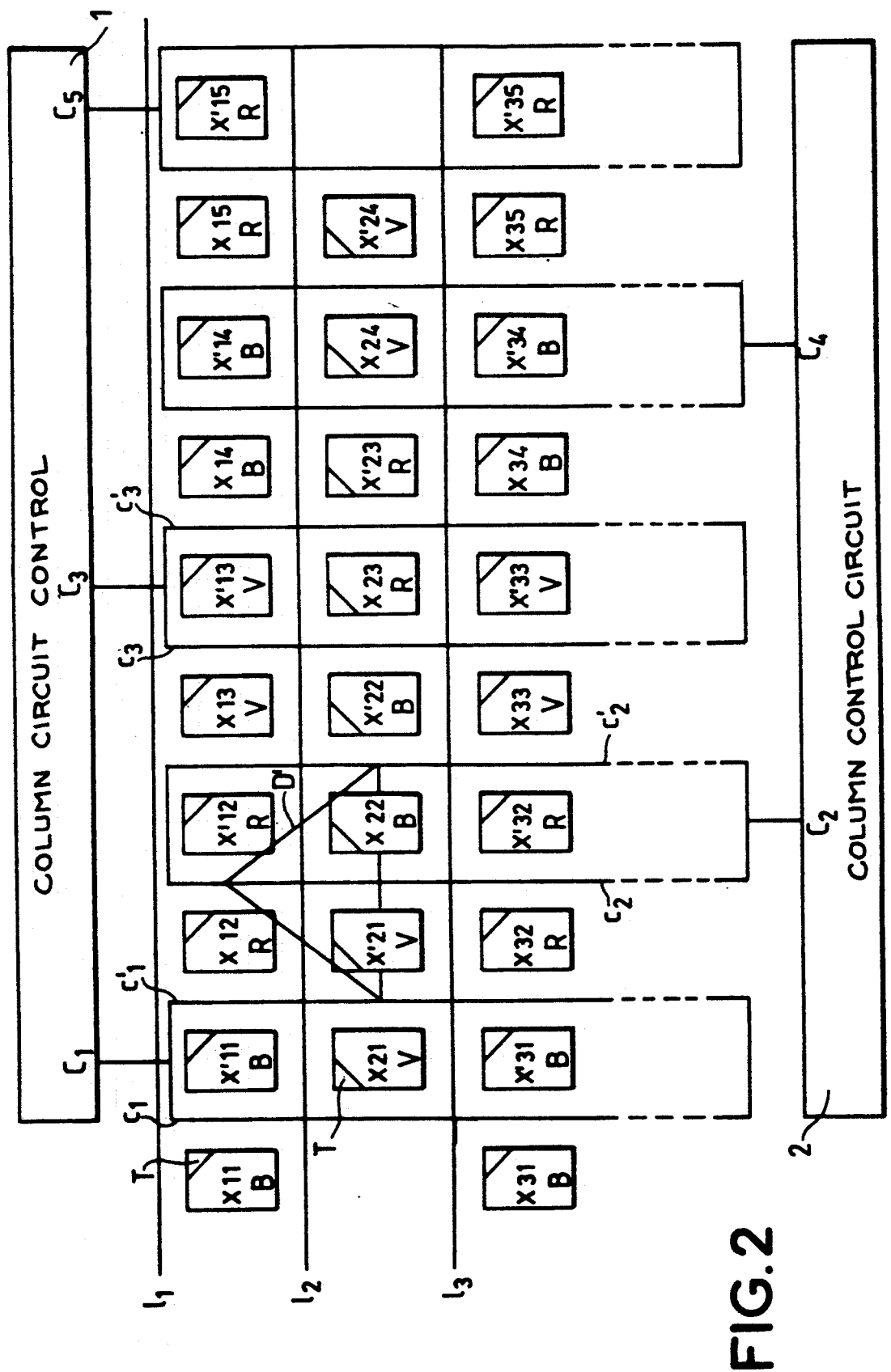
FIG. 2 shows a schematic and partial view of a color matrix screen with colored filters in triad or delta layout according to the present invention.

As is shown in FIG. 2, the screen essentially has a matrix of line conductors 11, 12, 13, . . . and column conductors C1, C2, C3, . . . According to the present invention, and as shown in the drawing, the column conductors C1, C2, C3 are each constituted by two parallel column elements c1, c'1, c2, c'2, c3, c'3, . . . , that are connected to one another at each end.

Each of the "compartments" demarcated by two neighboring line conductors and two conductors of neighboring column elements comprises a liquid crystal cell. These cells are respectively referenced X1.1, X'1.1, X1.2, X'1.2, X1.3, X'1.3, X1.4, X'1.4, X1.5, X'1.5 . . . for the first line of cells, namely the cells between the line conductors 11, 12. The cells of the second line, namely the cells between 12 and 13, are referenced X2.1, X'2.1, X2.2, X'2.2, X2.3, X'2.3, X2.4, X'2.4, and so on and so forth for the other cells.

In a known way, each cell is constituted by a liquid crystal series-connected with a transistor T. According to the present invention, colored filters are associated with each cell Xi.i, X'i.i according to a triad or delta layout. More specifically, the blue filters are superimposed on the cells X1.1, X'1.1, X1.4, X'1.4 of the first line, the cells X2.2, X'2.2 of the second line and the cells X3.1, X'3.1, X3.4, X'3.4 of the third line. Moreover, the red filters are superimposed on the cells X1.2, X'1.2, X1.5, X'1.5 of the first line, the cells X2.3, X'2.3 of the second line and the cells X3.2, X'3.2, X3.5, X'3.5 of the third line. The green filters are therefore superimposed on the cells X1.3, X'1.3, of the first line, the cells X2.1, X'2 1, X2.4, X'2.4 of the second line and the cells X3.3, X'3.3 of the third line. Consequently, the colored filters are arranged according to the sequences A,A, B,B, C,C, namely blue-blue, red-red, green-green for the lines n,n which may be even or odd, and according to the sequences C,C A,A, B,B, namely green-green, blue-blue, red-red, for the lines n+1. Furthermore, in accordance with the present invention and as shown in FIG. 2, an offset of a pixel is observed at each end of the lines n+1. Indeed, the first pixel X2.1 of the second line is aligned with the pixels X'1.1 or X'3.1 of the lines 11 and 13 as shown in FIG. 2.

According to the invention, the adjacent pixels of a line having colored filters of a same color are each connected to a different column element. Thus, as shown in the drawing, the cell X1.1 is connected by the transistor T represented by a single line on the column element c1 while the cell X'1.1 is connected to the column element c'1. In the same way, the cell X1.2 is connected to the column element c2 and the cell X'1.2 is connected to the column element c'2. For the line 12, it is seen that the cell X2.1 is connected by the transistor T to the column element c1 and that the cell X'2.1, for its part, is connected to the column element cells.

Figure 1:
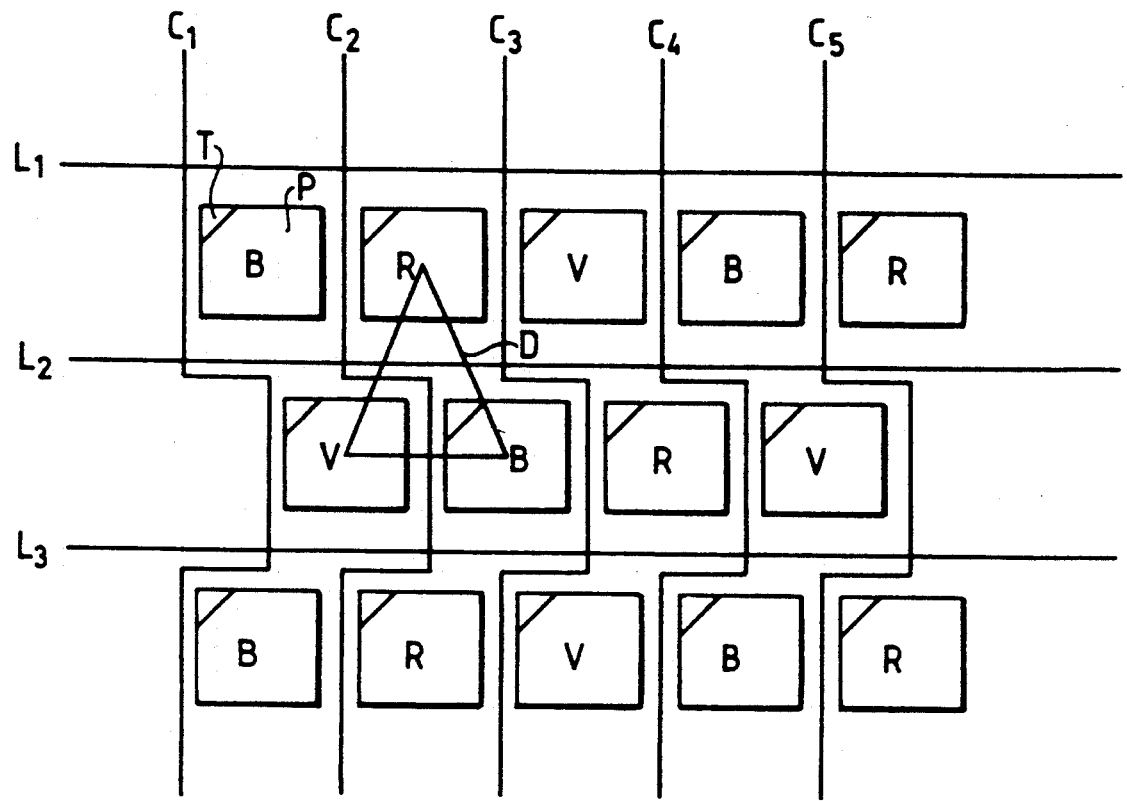
FIG. 1, already described, shows a schematic filters in triad or delta layout according to the prior art.
Figure 3:
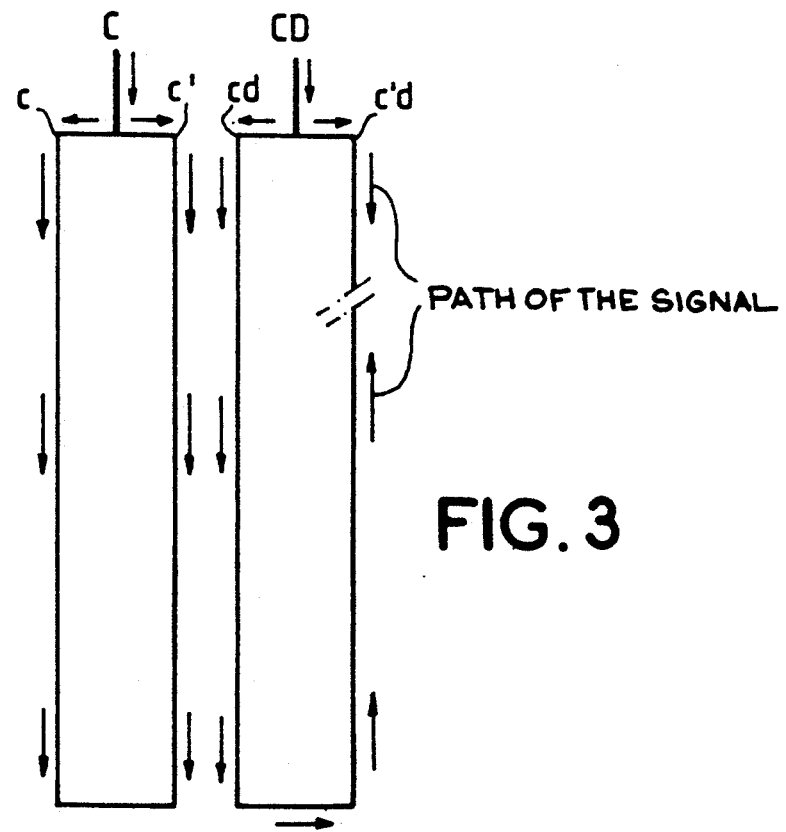
FIG. 3 is an explanatory drawing.

The use of a column conductor C1, C2, C3, C4, C5 set up by two parallel column elements c1, c'1 or c2, c'2, . . . has a certain number of advantages. In examining the figure, it is seen that each pixel is in fact commanded by two column elements. This eliminates the risks of non-operation in the event of a cut-off at a column element. Indeed, in this case, the pixel is controlled by the other column element, even if the command is delayed. This is shown schematically in FIG. 3. In this figure, the column C has two faultless column elements c,c' and the path of the signal symbolized by an arrow is separated into two while the column CD has a column element c'd with a cut-off, the other element cd being faultless. In this case, the path of the signal is the one represented by arrows. Furthermore, a structure is obtained wherein the pixels are aligned along the lines and along the columns, which facilitates their making as well as the making of the conductors which, for their part, are also aligned. Furthermore, the columns may be made with a width that is smaller than that of the columns of FIG. 1 and the transistors may also be smaller. As a consequence, this approach does not act to the detriment of the aperture factor even if the number of pixels has been increased for a given screen size. Furthermore, with this type of screen, there is always obtained a triad or delta arrangement, as shown by the triangle D' in FIG. 2, with all the advantages that result therefrom.

Furthermore, the double column structure is quite transparent as regards the addressing, so that the use of this structure in no way modifies the addressing method of the screen.

The color matrix screen with colored filters shown in FIG. 2 shall be preferably used as a television screen. Consequently, given the present display format used in television, which is a 4/3 format, the pixels preferably have dimensions x/y substantially equal to 4/3. Preferably, these dimensions x/y will be substantially equal to 2/3, x being the linewise dimension of the pixel and y being the columnwise dimension of this pixel. For example, in the prior art, a pixel has a dimension of 284 $\mu m \times 212$ $\mu m$, while a pixel for a matrix screen according to the present invention can be made with a dimension of 142 $\mu m \times 212$ $\mu m$.

According to one characteristic of the present invention, the addressing of the columns may be an interdigitated addressing, i.e. the odd columns such as C1,n C3, C5 are connected to a first control circuit 1 while the even columns C2, C4 are connected to a second control circuit 2. It may also be non-interdigitated addressing (all the columns are addressed to a control circuit 1 located at one of the ends of the column) or redundant non-interdigitated addressing (all the columns are addressed to two control circuits 1 and 2 at each of the ends of the column). The line addressing, for its part, may be achieved in a known way by using a progressive addressing method. However it is clear to those skilled in the art that other types of addressing may be used so as to retrieve a color signal.

What is claimed is:

1. A color matrix screen with colored filters in a triad or delta layout,
    wherein the pixels are formed by two adjacent sub-pixels that are aligned along the lines and columns of the matrix, the colored filters of the lines n (n may be odd or even) being arranged according to the sequence A,A, B,B, C,C and the colored filters of the lines n+1 being arranged according to the sequence C,C, A,A, B,B where A,B,C is any combination of red, green, blue with the offset of a sub-pixel at each end of the line, and wherein each column is constituted by two parallel column elements connected to each other at each end, two adjacent sub-pixels of a line with colored filters of a same color being each connected to a different column element.

2. A matrix screen according to claim 1, wherein each sub-pixel has a ratio x/y=1/3, x being the linewise dimension of the sub-pixel and y being its columnwise dimension.

3. A matrix screen according to either of the claims 1 or 2, wherein the even columns are connected to a first control circuit and the odd columns are connected to a second control circuit so as to achieve an interdigitated addressing.

4. A matrix screen according to claim 3, wherein the line addressing is a progressive addressing.

5. A matrix screen according to claim 1, wherein each sub-pixel is controlled by a switching element.

* * * * *